United States Patent [19]
Abe et al.

[11] Patent Number: 4,512,367
[45] Date of Patent: Apr. 23, 1985

[54] ROTATION DETECTING APPARATUS

[75] Inventors: Michio Abe; Naoyuki Maeda, both of Aichi, Japan; Robert M. Lynas, Pepper Pike, Ohio

[73] Assignee: Tokai TRW & Co. Ltd., Aichi, Japan

[21] Appl. No.: 472,676

[22] Filed: Mar. 7, 1983

[30] Foreign Application Priority Data

Mar. 15, 1982 [JP] Japan .................................. 57-40517

[51] Int. Cl.³ ............................................ F16D 31/02
[52] U.S. Cl. .................................. 137/554; 180/132; 336/131; 336/136
[58] Field of Search ................... 60/431, 388; 180/132; 336/131, 135; 137/557

[56] References Cited

U.S. PATENT DOCUMENTS

| | | | |
|---|---|---|---|
| 3,573,693 | 4/1971 | Chass | 336/135 |
| 3,580,352 | 5/1971 | Hestad et al. | 180/132 |
| 3,612,202 | 10/1971 | Moon, Jr. et al. | 60/431 |
| 3,882,436 | 5/1975 | Chass | 336/135 |
| 3,991,846 | 11/1976 | Chichester et al. | 180/132 |
| 4,013,911 | 3/1977 | Fujiwara et al. | 336/135 |
| 4,418,778 | 12/1983 | Sato et al. | 180/132 |
| 4,445,103 | 4/1984 | Chass | 336/131 |

Primary Examiner—A. Michael Chambers
Attorney, Agent, or Firm—Yount & Tarolli

[57] ABSTRACT

A rotation detecting apparatus for a power steering system of a vehicle is described which comprises a control valve coupled to a steering shaft of a steering wheel of the vehicle for controlling a flow of power fluid supplied to a power cylinder for powering a steering operation, a rotator magnet secured on an input shaft of the control valve to rotate therewith as a body, a concentric-circle shaped stator coil adapted to face to the rotor magnet, and a casing functioning also as an iron core yoke mounted on a housing of the control valve for receiving the rotor magnet and the stator coil and supporting the stator coil, whereby, when the input shaft is rotated in response to the steering operation of the steering wheel, an electromotive force is produced so as to detect a displacement in rotation of the input shaft.

5 Claims, 9 Drawing Figures

ROTATION DETECTING APPARATUS

BACKGROUND OF THE INVENTION

The present invention relates to a rotation detecting apparatus and, in particular, to an apparatus suitable for detecting an amount of steering angle change, as one of parameters for controlling a power steering mechanism which assists a steering operation of an automobile in power.

Heretofore, the steering angle change in the power steering mechanism has been detected by means of a detector which is mounted on a steering column shaft or in the vicinity of a steering wheel and converts the steering angle change to an electric signal, or by means of converting the torsional stress of a torsion bar of a control valve (servo valve) to an electric signal, the valve controlling the supply of power fluid to a power cylinder in cooperation with the steering wheel. However, such detecting means cannot give effect to faithfully detect a subtle change of an actual steering angle of the wheel and an amount of power assistance for the power servo mechanism because it is adversely effected by the stress of the steering column shaft, the universal joint, the torsion bar of the control valve and the like when the rotation of the steering wheel by a manual operation is transmitted to the power steering mechanism. Additionally, it is very difficult in practical application provide a conventional detecting means as described above in the power steering mechanism because it is complicated in construction.

SUMMARY OF THE INVENTION

The present invention provides a novel rotation detecting apparatus by which the above-mentioned problems can be overcome.

It is, therefore, an object of the present invention to provide a rotation detecting apparatus which is simple in construction and capable of providing an accurate detecting output by means of incorporting an alternator construction in the control valve cooperating with the steering wheel so as to cause the alternator to detect an angular change of rotation of an input shaft of the control valve.

This and other objects and advantages of the present invention will be appeared more clearly from the following detailed disclosure read in conjunction with the accompanying drawings.

DESCRIPTION OF THE PREFERRED EMBODIMENT

Figure 1:
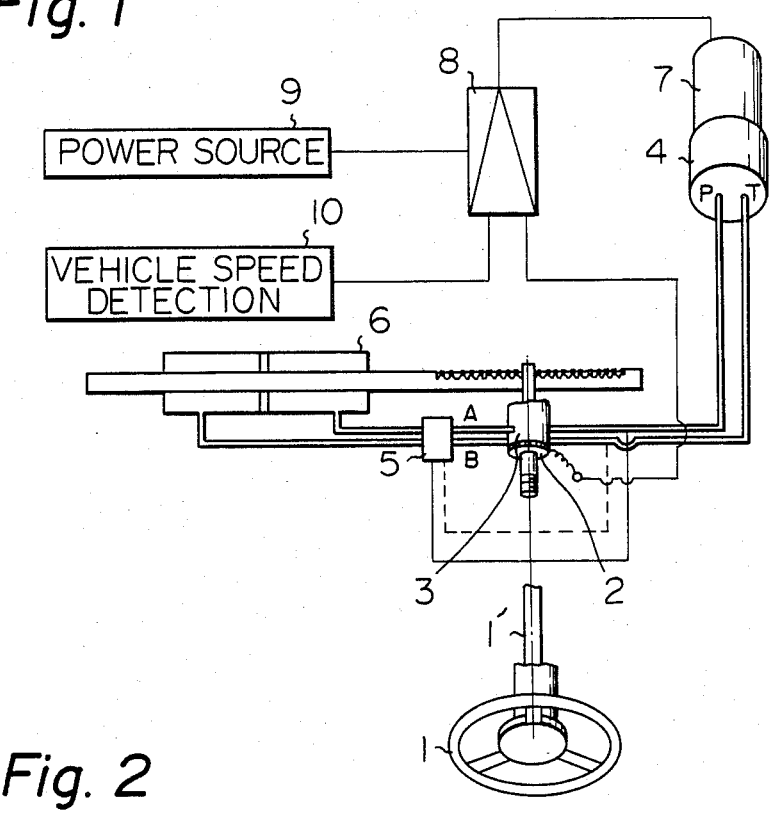
FIG. 1 is a schematic diagram of a power steering system for powering a steering opartion of automobile, in which a rotation detecting apparatus of the present invention may be incorporated.

FIG. 1 is a schematic diagram of a power steering system for powering a steering operation of an automobile, in which a rotation detecting apparatus of the present invention may be incorporated. A steering wheel 1 is coupled through a steering column shaft 1' to a control valve 3 in which the rotation detecting apparatus 2 is incorporated. An input side of the control valve 3 is connected to both a supply port P and a return port T of an electrical oil pump 4 as a power assisting source. Ports A and B of an output side of the control valve 3 are connected through a by-pass valve 5 to chambers, respectively, of a hydraulic circuit in a cylinder 6 which acts as an actuator. The by-pass valve 5 communicates between the ports A and B and acts to reduce a power fluid resistance in the circuit when a power steering state is switched to a manual steering state. The power fluid from the oil pump 4 is applied through the control valve 3 to any one of the chambers of the cylinder 6 which, in response to the pressurized power fluid, is operated to move a piston of the cylinder 6 in any of left and right directions to produce power assistance. The back pressure of the cylinder is applied to the return port T of the oil pump 4 through the control valve 3. An output of the cylinder 6 is transmitted to left and right wheels (not shown) of the automobile at both ends of a rack bar to power a steering operation of the steering wheel. An electric motor 7 for driving the oil pump 4 is connected to an electrical driving controller 8. The controller is connected to a power source 9, such as a battery or an alternator, and receives detected signals from the rotation detecting apparatus 2 and a vehicle speed detecting apparatus 10 to apply an electric power output for powering the steering operation to the motor 7. In practice, the driving controller 8 is so constructed that it is operated when the detected signal from the rotation detecting apparatus 2 is received or when the steering wheel is rotated, to output an electric signal to rotate the motor in response to the detected signal from the vehicle speed detecting apparatus, that is, the vehicle speed, to thereby control the auxiliary steering force by sending in pressure the power fluid from the oil pump 4 to the cylinder 6 in such a power steering state that the vehicle speed does not exceed a predetermined value.

Figure 2:
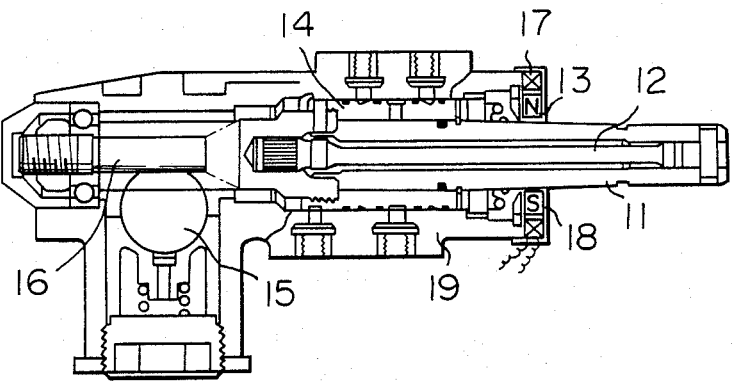
FIG. 2 is a sectional view showing a mechanical construction of the rotation detecting apparatus of the present invention.

FIG. 2 shows a concrete construction of the rotation detecting apparatus 2 of the present invention which is incorporated in the control valve 3 shown in FIG. 1. The rotation detecting apparatus comprises a rotor magnet 13 mounted at one end of the control valve 3, a stator coil 17 and a casing 18 functioning also as an iron core yoke for receiving the magnet and the coil. The rotor magnet 13 is secured on an input shaft 11 of the control valve 3 for rotation therewith as a body. The rotation detecting apparatus, therefore, has such an alternator construction for generating electromotive force by the rotation of the input shaft 11 of the control valve 3.

When the input shaft 11 rotatably coupled to the steering column shaft 1' receives rotation torque on the operation of the steering wheel, the input shaft 11 and the rotor magnet 13 are rotated by a torsion bar 12 within the range of a predetermined angle. At this time, the power fluid in a valve sleeve 14 loses the balance in quantity of flow, and is applied to any one of the ports A and B to actuate a rack bar 15. By the actuation of the rack bar 15, a pinion shaft engaged therewith is rotated and, at the same time, the valve sleeve 14 is rotated to return to its neutral position.

In substance, there is a synchronous and follow-up relationship between the displacements of the input shaft 11 and the valve sleeve 14 because the power fluid is applied to the cylinder chamber in response to a relative displacement of the valve sleeve 14 to the rotating displacement of the input shaft 11 of the control valve 3. Therefore, as shown in FIG. 2, an accurate information on the angular change of the steering operation, which is suitable to control the power steering mechanism, can be obtained by the detection of the rotating displacement of the input shaft.

Figure 3:
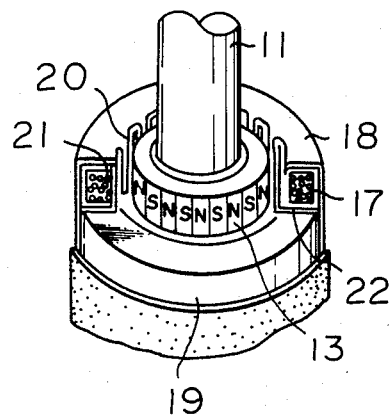
FIG. 3 is an enlarged view of a part of the rotation detecting apparatus as shown in FIG. 2, which is partially lacked.

FIG. 3 is a partially enlarged view of the rotation detecting apparatus 2 of the control valve 3 shown in FIG. 2. The rotor magnet 13 having a plurality of magnetic poles on the outer surface thereof is mounted on the periphery of the input shaft 11 through a non-magnetic material and is adapted to rotate with the input shaft 11 as a body. A stator side which is subjected to the magnetic field induced by the magnetic poles of the rotor magnet 13 comprises a plurality of stator components, such as an N-pole stator core 20, an S-pole stator core 21, a stator yoke 22, and a stator coil for generating induction current, and these stator components are secured by the casing 18 on the housing 19 of the control valve 3. In this construction, an alternating voltage can be output through the stator coil 17 when the input shaft 11 is rotated.

Although the rotation detecting apparatus is formed as an alternator in the preferred embodiment, it should be noted that the apparatus can be easily designed as a D.C. generator provided that an oil-sealed construction of a commutator is considered as a counterplan for oil leakage.

Further, according to this type of the rotation detecting apparatus, since a voltage proportional to the rotating velocity of the input shaft can be generated, the steering angular velocity also can be simultaneously detected as the steering opration. Accordingly, it is possible to control electrically the proper number of revolution of the oil pump, respeousive to high and low steering speed, and the quantity and pressure of power fluid proportional thereto.

Figure 4:
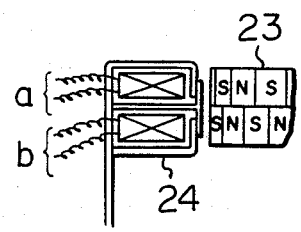
FIG. 4 is a diagram showing another preferred embodiment of both the rotor magnet portion and the stator portion as shown in FIG. 3.
Figure 5:
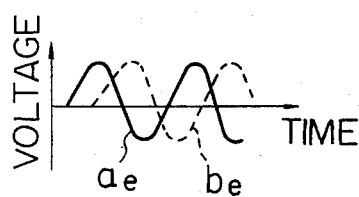
FIG. 5 is an output signal waveform diagram of the embodiment as shown in FIG. 4.
Figure 6:
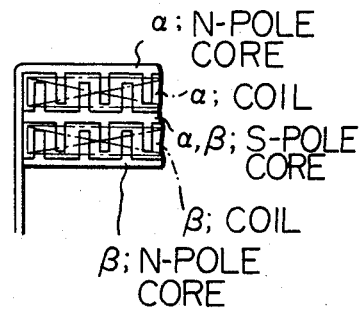
FIG. 6 is a diagram showing still another preferred embodiment of the stator portion as shown in FIG. 3.

Also, although, in the preferred embodiment, the rotation detecting apparatus has been explained for the purpose of controlling the quantity of power fluid in the power steering mechanism, it should be noted that the apparatus of this invention may be used as a steering sensor for a load leveling apparatus by which an attitude of the vehicle can be controlled and adjusted while the vehicle is running. FIG. 4 shows a constructional example suitable for such a use, which is capable of detecting the steering angle, the steering angular velocity and the steering directions. In this case, since it is necessary to detect reliably any steering direction of a colckwise and counterclockwise directions of the steering wheel, the steering sensor is constructed so that a plurality of magnetic poles are arranged along the axial direction of a rotor magnet 23 in a multi-row manner so as to output two signals having the 90° phase difference therebetween, such as detected signals $a_e$ and $b_e$ as shown in FIG. 5, from coil output terminals a and b in response to the rotating displacement of the input shaft 11 in the clockwise direction or the counterclockwise direction, whereby the attitude of the vehicle, that is, the right or left inclination of the body is controlled by these output signals. On the other hand, if coils and cores, $\alpha$ and $\beta$, on the stator side are constructed to be in phase, as shown in FIG. 6, a single-row rotor magnet as shown in FIG. 3 can be used by putting the 90° phase difference between $\alpha$ and $\beta$ in relation to the poles of the cores on the stator side, provided that the magnets on the rotor side, as shown in FIG. 4, are arranged in a multi-row manner and have the 90° phase difference therebetween.

Figure 7:
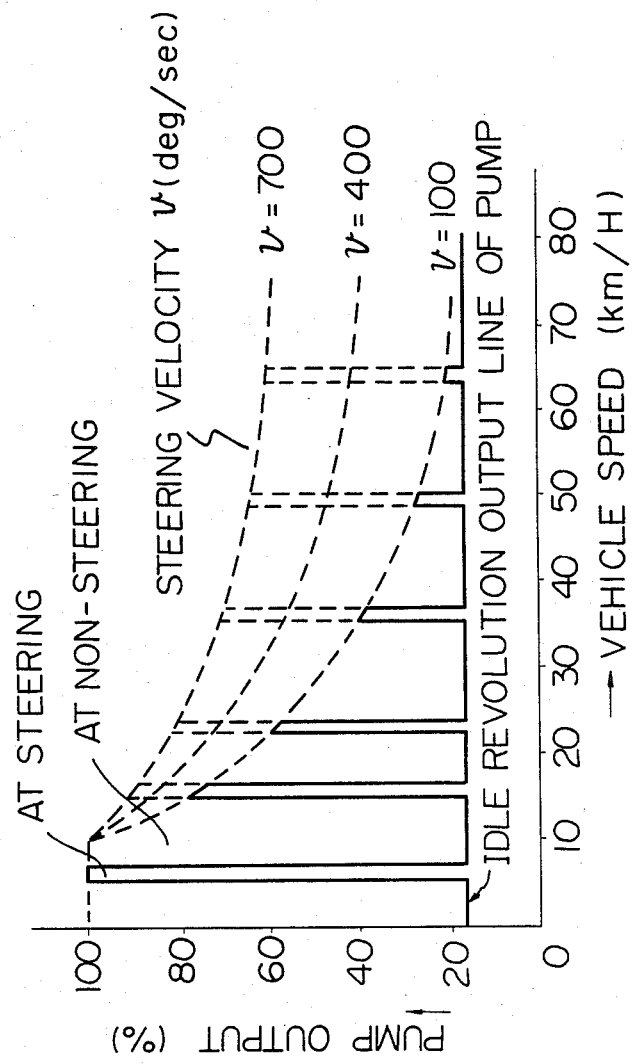
FIGS. 7, 8 and 9 are characteristic curves showing a relationship between the output of the oil pump and the vehicle speed, each of which varies in response to the steering operation speed detected by the apparatus of the present invention.
Figure 8:
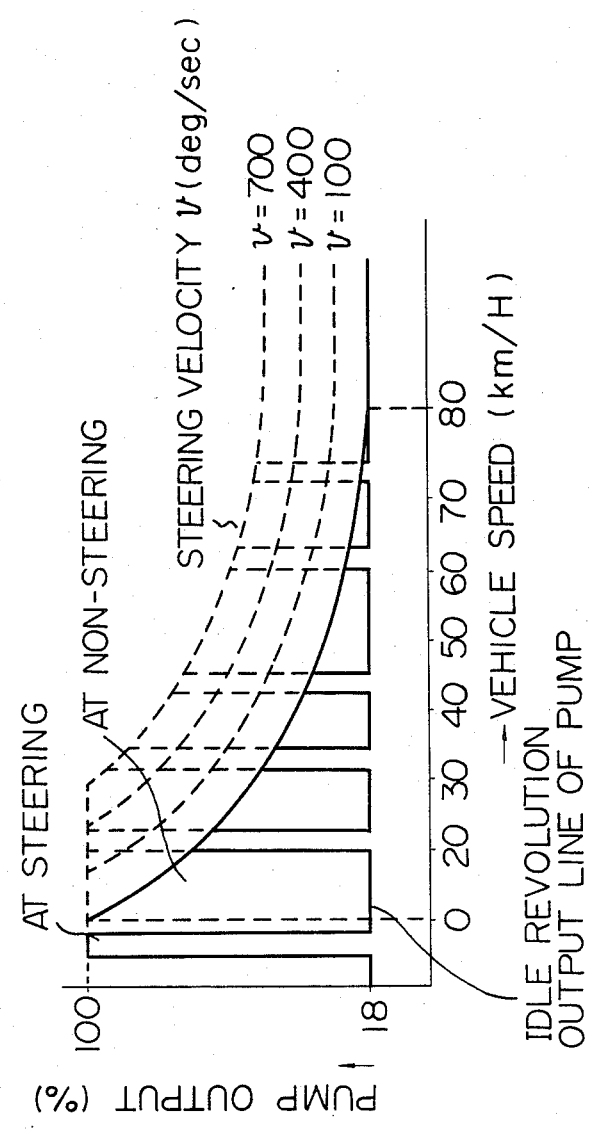
Figure 9:
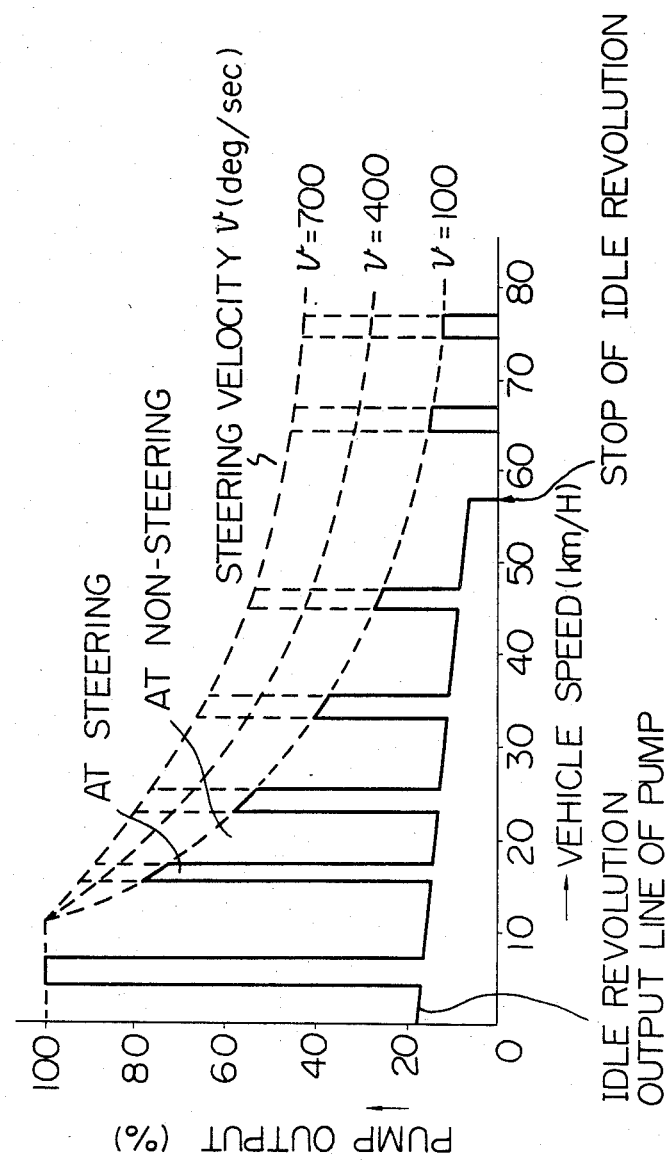

FIGS. 7, 8 and 9 are characteristic curves which are preferably accomplished by the present invention and show the changes of the quantity of power fluid discharged from the oil pump, the changes being responsive to the steering speed. In particular, FIGS. 7 and 8 are the characteristic curves in such a case that the idle revolution output of the oil pump is maintained at a fixed value throughout the overall vehicle speed, and FIG. 9 is the characteristic curve of the type of saving energy, such that the idle revolution output of the oil pump decreases in response to the vehicle speed and the idle revolution is stopped at a higher speed state of the vehicle.

As mentioned above in detail, according to the present invention, the input shaft of the control valve (servo valve) in the power steering mechanism of the vehicle is formed as a portion of the rotation detecting apparatus so as to detect directly the rotation of the input shaft. Therefore, a simple construction of the apparatus can be accomplished and the change of the steering angle can be accurately detected. Additionally, the rotation detecting apparatus of the present invention, which is incorporated with the control valve, is hardly affected by vibration and, therefore, is well fitted for use in an automobile.

What is claimed is:

1. A rotation detecting apparatus for a power steering system of a vehicle, comprising:
    control valve means coupled to a steering shaft of a steering wheel of the vehicle for controlling a flow of power fluid supplied to a power cylinder for powering a steering operation;
    rotator magnet means secured on an input shaft of said control valve means for rotation therewith as a body;
    concentric-circle shaped stator coil means adapted to face to said rotor magnet means; and
    casing means functioning also as an iron core yoke mounted on a housing of said control valve for receiving said rotor magnet means and said stator coil means and supporting said stator coil means, whereby, when said input shaft is rotated in response to the steering operation of said steering wheel, an electromotive force is produced so as to detect a displacement in rotation of said input shaft.

2. The apparatus as set forth in claim 1 further characterized in that said rotor magnet means has a plurality of magnetic poles which are mounted on the periphery of said input shaft to cause said stator coil means to output an A.C. signal as a detected signal in response to the rotation of said input shaft.

3. The apparatus as set forth in claim 1 further characterized in that said rotor magnet means has two sets of magnetic poles which face to said stator coil means and are arranged along an axial direction of the rotor magnet means in multi-row manner to cause the stator coil means to output two detected signals having the 90° phase difference therebetween in response to the rotation of said input shaft in any of clockwise and counterclockwise directions.

4. The apparatus as set forth in claim 1 further characterized in that said stator coil means comprises two sets of stator coils which face to said rotor magnet means and are arranged along an axial direction of the rotor magnet means in a multi-row manner to cause the stator coils to output two detected signals having the 90° phase difference therebetween in response to the rotation of said input shaft in any of clockwise and counterclockwise directions.

5. A power steering system for effecting turning movement of steerable vehicle wheels in response to rotation of a steering wheel, said power steering system commprising a fluid motor operable to turn the steerable vehicle wheels, pump means for supplying fluid under pressure, motor means for driving said pump means to discharge fluid from said pump means at a rate which varies as a function of the rate of operation of said motor means, valve means connected in fluid communication with said pump means and said fluid motor for controlling fluid flow from said pump means to said fluid motor, said valve means including stationary valve surface means, a movable valve element which is rotatable about its central axis relative to said stationary surface means, a housing connected with said stationary valve element and at least partially enclosing said movable valve element, and control means for varying the rate of operation of said motor means as a function of actuation of said valve means, said control means including signal generator means for providing an output voltage which varies as a function of rotation of said movable valve element relative to said stationary valve surface means and means for varying the operation of said motor means as a function of the output voltage from said signal generator means, said signal generator means including a circular rotor connected in a coaxial relationship with said movable valve element for rotation therewith about the central axis of said movable valve element and a circular stator connected with said housing and circumscribing said rotor, and means for rotating said movable valve element and rotor together relative to said housing and stator upon rotation of the steering wheel.

* * * * *